No. 834,467. PATENTED OCT. 30, 1906.
F. H. GRAFTON.
METHOD OF FORMING SEAMS FOR SHEET METAL.
APPLICATION FILED DEC. 29, 1905.
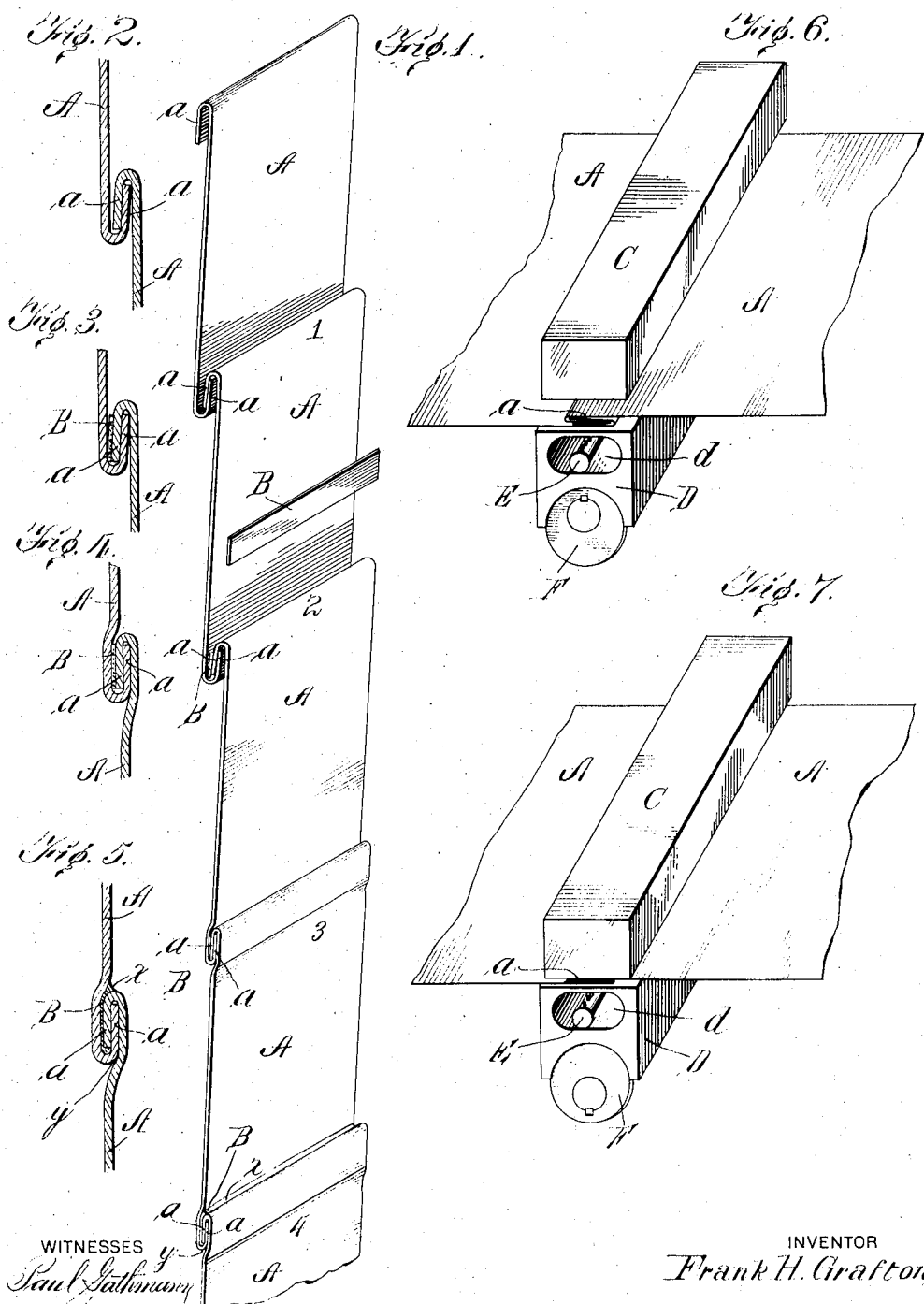
INVENTOR
Frank H. Grafton.
BY HIS ATTORNEYS

UNITED STATES PATENT OFFICE.

FRANK H. GRAFTON, OF WHEELING, WEST VIRGINIA, ASSIGNOR TO WHEELING CORRUGATING COMPANY, OF WHEELING, WEST VIRGINIA, A CORPORATION OF WEST VIRGINIA.

METHOD OF FORMING SEAMS FOR SHEET METAL.

No. 834,467.　　　　Specification of Letters Patent.　　　　Patented Oct. 30, 1906.

Application filed December 29, 1905. Serial No. 293,828.

*To all whom it may concern:*

Be it known that I, FRANK H. GRAFTON, a citizen of the United States, residing in Wheeling, in the county of Ohio and State of West Virginia, have invented certain new and useful Improvements in Methods of Forming Seams for Sheet Metal, of which the following is a specification.

The object of my invention is to join sheets of metal in an improved way, and my invention is especially designed to join sheets of tin in the manufacture of tin roofing. Ordinarily sheets of tin (usually measuring twenty by twenty-eight inches) are bent along their opposite ends to form flanges which are interlocked, compressed, and soldered, the solder being applied along one edge of each seam by means of a soldering-iron which melts the solder from a stick or wire as it is moved along the joint. So far as I am aware, this method is the only one heretofore extensively employed for forming seams in tin roofing. In the old method there is often a great waste of solder, and sometimes the solder is unevenly distributed and places are left uncovered, and thus leaks occur. Furthermore, this process is comparatively slow.

According to my invention I bend the ends of the sheets to form interlocking flanges in the usual way, interlock these flanges, and then insert a strip of solder in the joint of sufficient size to extend approximately from end to end of the joint and to provide sufficient material to fill the open seam on one side of the sheets when the joint is compressed and the solder is melted. The strips of solder are preferably all cut to approximately the same length. This corresponds approximately with the length of the joint, and they are dipped in a suitable flux before being dropped into the joint. After this the joint or seam is compressed, and then it is heated and compressed in such manner as to melt the solder and cause it to spread and to unite the adjacent interlocking faces of the joint on one side and to close the seam at the outer edge of the joint.

I have illustrated in the accompanying drawings diagrammatically how my invention may be carried out.

Figure 1 is a diagram showing how sheets of tin are joined according to my invention. Fig. 2 is a cross-section of the seam before the strip of solder is inserted and before the joint is compressed. Fig. 3 is a similar view with the solder inserted. Fig. 4 shows the seam as it appears after the solder is inserted and after the first compressing operation. Fig. 5 shows a completed seam after the solder has been melted and spread and the final compression has been given. Figs. 6 and 7 are perspective views illustrating means which may be employed for melting the solder and giving the final compression. Fig. 6 shows the position of the parts before compression has taken place, and Fig. 7 shows the parts in the act of compressing the seam.

The sheets of tin A are formed at each opposite end with a flange $a$ in the usual way and are interlocked in the ordinary manner. After two sheets have been joined in the manner shown at 1 in Fig. 1 a strip of solder B is dropped into the joint in the manner shown at 2 in Fig. 1. This strip is quite thin, preferably thinner than sheet-tin; but it is of sufficient size to provide enough solder to completely fill the joint when melted and to firmly secure the adjacent folds of the joint together. It will be observed that the strip is dropped into the open joint edgewise, so that it rests on the bottom of the joint after it is inserted. The strips B have a flux applied to them before they are deposited in the joint. This may be done by dipping the strips in a flux, such as powdered rosin, or the strips may be stored in a box of powdered rosin and taken out one at a time, as required. After a strip has been dropped into the joint, as indicated at 2, the seam is compressed in any suitable way and will then appear as indicated at 3 in Fig. 1. Then the seam is heated and compressed, so that it is flattened to the desired extent, and the solder is melted and spread in such way as to fill the joint in the manner indicated at 4 in Fig. 1. The seam or joint is then complete. It will be observed that the solder not only joins the folds of the seam at the edge $x$ and completely closes the joint along its edge, but it extends between the folds of the seam and secures them together along the flat inner faces of the adjacent folds. It will be understood that the outer faces of the sheets are those at the right in Figs. 1 to 5 and that it is not necessary to solder the joint at y, as this is on the under side and will not be exposed.

While I preferably use tapes or thin strips of solder, it is possible to use wire made of solder; but this is not as good. Any suitable mechanism may be employed to form the joints at 1 2 3 in Fig. 1, and there are many ways in which the joint may be finished at 4 in Fig. 1. One way of doing this is indicated in Figs. 6 and 7. In these figures, C indicates an anvil, and D a cross-bar. The anvil is fixed or stationary, while the cross-bar is adapted to move toward and from the anvil. The cross-bar is hollowed out at d and contains a burner E, to which gas or oil may be supplied in well-known ways. The cross-bar is supported by cams or eccentrics F, which may be operated to raise and lower it. The sheets A are fed between the anvil and cross-bar in the manner indicated in Fig. 6, and when the seam is between them the solder is melted, and the seam is compressed as the cross-bar rises in the manner indicated in Fig. 7.

By my improvements I am enabled to join sheets of metal very rapidly and to produce uniform and perfect joints without waste of solder. The seam is not so apt to break as the old seam, because the solder unites the parts not only at the edge of the seam, but also on the flat inner faces thereof. It is evident that while one seam is receiving a strip of solder another seam may be compressed, while a third seam is being heated and compressed, so that my process may be embodied in apparatus which will form rapidly strips of roofing, plates, or sheets of indefinite length made up of sections joined by seams of an improved construction.

I have described the preferred way of carrying out my invention; but the steps of the process may be somewhat modified. For instance, while I prefer to compress the seam in the manner indicated at 3 in Fig. 1, before it is subjected to the heating and final compressing the step indicated at 3 may be omitted. By "compressing" I mean flattening down the joint. This may be effected by continuous pressure, by hammering, or in other well-known ways.

I claim as my invention—

1. The method herein described of joining sheets of metal, which consists in bending the ends of the sheets to form interlocking flanges causing these flanges to engage each other, then inserting a strip of solder in the open joint between the flange of one sheet and the body portion of the other sheet and then compressing and heating the joint to melt and spread the solder and flatten the seam.

2. The method herein described of joining sheets of metal, which consists in bending the ends of the sheets to form interlocking flanges, causing these flanges to engage each other, dropping a strip of solder edgewise into the open joint to cause it to rest on the bottom of the seam between the flange of one sheet and the body portion of the other sheet, then heating and compressing the joint to melt and spread the solder and cause it to close the seam at its outer edge and also to unite the flat inner faces of the seam.

In testimony whereof I have hereunto subscribed my name.

FRANK H. GRAFTON.

Witnesses:
D. D. McCray,
S. G. Graham.